Figures 1, 2:
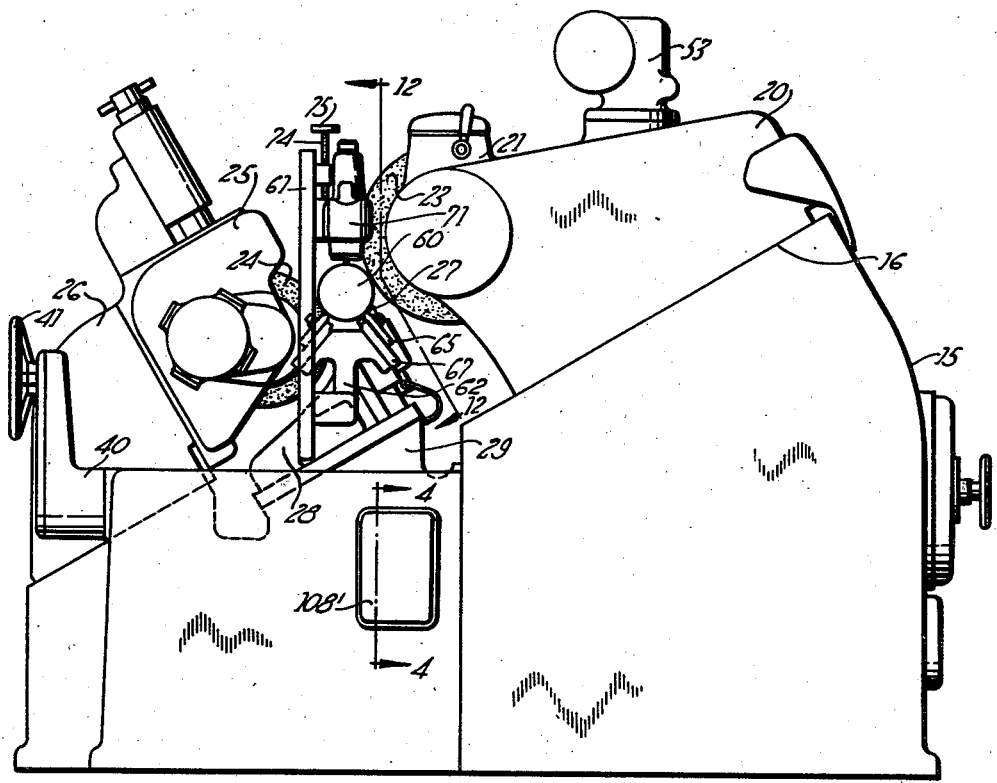

tures the reaction is somewhat slower and the wax-phenol becomes more viscous and in such cases it is desirable to use a suitable inert diluent or solvent such for example as ethylene chloride, to reduce the viscosity of the reaction mixture and to cut down its tendency to foam. At 300° F. the time required to complete the reaction depends upon the time required for the addition of the acid chloride to the mixture, the latter being limited only by the foaming produced by the evolution of hydrogen chloride gas. After esterification, the product is purified to free it of aluminum chloride since we have discovered that residual aluminum chloride tends to impair the stability of the depressant. The product may be conveniently purified by a process of water-washing. The washing with water alone is difficult because of the great tendency of the product to emulsify, but it has been found that if there is admixed with the water an alcohol, such as butanol, and the product washed preferably about a half dozen times with equal volumes of water, each volume of water containing about 2% butanol, the aluminum chloride, chlorine etc., are substantially completely removed. The washing should be carried out with vigorous stirring and at relatively high temperatures, preferably at about 175° F. Also the washing should be continued until the product preferably contains an amount of aluminum corresponding to not more than about 0.02% of aluminum chloride.

The following example of the preferred method of this invention illustrates more particularly the specific proportions which we prefer to use: 800 parts by weight of chlorwax, containing 14% of chlorine, and 74 parts by weight of phenol are melted together and heated to a temperature of 150° F. To this hot mixture is then added 24 parts by weight of aluminum chloride. The mixture is then heated to 250° F. and then slowly to 350° F. After the evolution of hydrochloric gas has ceased the reaction mixture is then cooled to 300° F. and 80 parts by weight by phthalyl chloride gradually added, the rate of addition being governed by the degree of foam formation resulting from the evolution of hydrochloric acid gas. After the acid chloride is completely incorporated in the mixture, it is then allowed to cool to about 175° F., washed six times with an equal volume of water containing 2% of butanol, using a fresh portion of water and alcohol for each washing. As a result of these operations, there is obtained somewhat in excess of 800 parts by weight of the phthalic ester of tetrawax-substituted-phenol which constitutes the preferred form of our novel pour point depressant.

The extraordinary effectiveness of our improved pour point depressant is illustrated by the data shown in the following table. In obtaining this data the depressants were admixed, in the indicated proportions, with a petroleum lubricant oil having a Saybolt universal viscosity of 249″ at 130° F., and a pour test (in the untreated condition), of 20° F. In the first horizontal line is shown the different percentages of depressant added to the oil. In the second horizontal line is shown the pour point of the oil without any depressant. In the third horizontal line is shown the different pour points of the oil containing different percentages of a well known depressant designated "naphthalene depressant" which is prepared by combining chlorwax and naphthalene according to well-known prior methods. Similarly the fourth horizontal line shows the pour points obtained after the addition to the oil of different percentages of a depressant prepared by combining chlorwax and phenol, while the fifth line shows in the same manner the pour points obtained after the addition to the oil of different percentages of the improved pour point depressant of the present invention, which is designated in this table as phthalate depressant.

Table I

| Percent depressant | A. S. T. M. pour points of lubricating oil containing various percentages of added depressants | | | | | | |
|---|---|---|---|---|---|---|---|
| | 0% | 1/32% | 1/16% | 1/8% | 1/4% | 1/2% | 1% |
| Oil alone | +20° F. | | | | | | |
| Naphthalene depressant | | | | +10° F. | 0° F. | −15° F. | −20° F. |
| Wax-phenol depressant | | | +5° F. | −10° F. | −25° F. | −25° F. | |
| Phthalate depressant | | −10° F. | −20° F. | −20° F. | −25° F. | −25° F. | |

From the above table, it is evident that the novel depressant herein disclosed is a vastly more effective depressant particularly at percentages below about 1/4% than either the naphthalene pour point depressant, widely known and used in the art, or the wax phenol depressant which is much more effective than the former. For instance the phthalate depressant is evidently about sixteen times as effective as the naphthalene depressant in attaining pour points of about −20° F., since a pour of −20° F. which requires 1% of the naphthalene depressant may be attained by 1/16 of 1% of the phthalate depressant.

The heat stability characteristics of this improved depressant is illustrated by the data presented in Table II. In obtaining this data, the above-mentioned oil, viz., lubricant oil of 249″ Saybolt at 130° F. containing different percentages of the different depressants was subjected to a heating test which has been found to quite closely simulate service conditions in an automobile crankcase. This test, which is herein referred to as the SOS test is accomplished by maintaining a 300 cc. sample of the oil at a closely controlled temperature of 342° F. in a glass beaker, the oil being continuously agitated with a motor-driven steel propeller. Samples are withdrawn at the expiration of three days and four days respectively for examination. A very considerable number of experiments have shown that two days of this heat test are about equivalent to 2,000 miles of normal service in the lubrication of an automobile gasoline engine. The effect of this heat test upon the pour points of the oil containing different percentages of wax phenol depressant and also upon the same oil containing different percentages of the phthalate depressant of the present invention is illustrated by the data shown in Table II in which the nature of the depressant is shown in vertical column I, the percentages of the different depressants in vertical column II, the initial pour points in vertical column III, and the pour points after three days and four days in vertical columns IV and V respectively.

*Table II*

| Depressant | Concentration of depressant in oil | A. S. T. M. pour test after SOS test at 342° F. | | |
|---|---|---|---|---|
| I | II | III | IV | V |
| | | Initial | 3 day | 4 day |
| Wax phenol depressant | ½% | −25° F. | −15° F. | −10° F. |
| Wax phenol depressant | ¼% | −25° F. | +5° F. | |
| Phthalate depressant | ¼% | −25° F. | −25° F. | −25° F. |
| Phthalate depressant | ⅛% | −20° F. | −20° F. | −20° F. |
| Phthalate depressant | ⅟₁₆% | −20° F. | −15° F. | |

From this table it will be observed that the improved depressant of the present invention even in concentrations as low as ⅟₁₆ of 1% retains sufficient efficiency, after exposure to conditions equivalent to 3,000 miles of normal driving service, to depress the pour point of the oil to a temperature well below any atmospheric temperature normally encountered in service, and that in somewhat greater concentrations it suffered practically no deterioration at all after exposure to these conditions.

The heat stability of this improved depressant under conditions closely approximating actual service conditions is illustrated by the data shown in the following Table III. In obtaining this data an automobile gasoline engine was attached to a dynamometer and lubricated with the above 249" oil containing ⅛ of 1% of the phthalate depressant and was operated for seventy-two hours under conditions corresponding to severe service conditions. As may be seen from Table III the oil after the run had exactly the same pour point as before the run.

*Table III*

Degrees Fahrenheit
Pour point of oil without depressant_____ +20
Pour point of oil containing ⅛% phthalate depressant before test_____ −20
Pour point of oil containing ⅛% phthalate depressant after 72 hours dynamometer test _____ −20

In addition to heat stability, it is likewise desirable, as previously mentioned, that a useful depressant be stable against hydrolysis, since an automobile crankcase, especially in winter, practically always contains some water produced by condensation of water vapor. The improved pour point depressant herein disclosed possesses a remarkably high resistance to hydrolysis, and is quite stable toward hydrolytic deterioration as was determined by subjecting the above-mentioned oil containing ⅟₁₆ of 1% of the depressant to reflux distillation with water for five days, after which the oil was found to have suffered no rise in pour point. Of further importance in this connection is the fact that if hydrolysis did occur to a very limited extent under extreme conditions it would be necessary only to increase the amount of depressant used by a very small fraction of 1% to still have more depressant efficiency than is necessary even under inordinately prolonged service under extreme conditions. Furthermore we have found that the possible products of hydrolysis have very little tendency to corrode the metals used in automotive equipment under normal conditions so that our improved depressant does not corrode such metals to any substantial extent even when used in the presence of such moisture.

While we do not wish to limit our invention to any specific explanation or theory as to the exact composition or molecular structure of the preferred form of our improved depressant, nevertheless, we believe it to be composed predominantly of a compound which corresponds substantially to the following general formula:

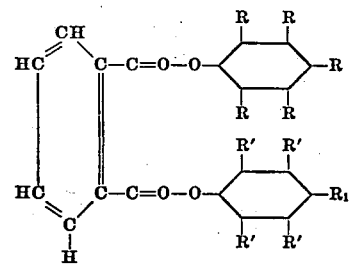

wherein four of the R's and four of the R''s are alkyl radicals corresponding to those which characterize petroleum wax, the remaining R's and R''s being hydrogen.

Our improved depressant may therefore be properly designated as a di-tetra-wax-phenyl-phthalate or in a more generic sense as a di-tetra-alkyl-phenyl-phthalate wherein the alkyl corresponds to an aliphatic hydrocarbon of relatively high molecular weight such as characterize the heavier petroleum fractions comprised within the range which includes petrolatum and the crystallin petroleum waxes.

We claim:

1. A mineral oil comprising a mixture of liquid oils and waxy hydrocarbons, and having incorporated therein a relatively small proportion of the phthalic ester of a heavy alkyl substituted phenol, said ester being capable of depressing the pour point of the oil.

2. A mineral oil comprising liquid oils and waxy hydrocarbons and having incorporated therein a relatively small proportion of the product produced by chemically condensing together phenol and chlorinated wax and thereafter esterifying the condensation product thus obtained with a substance selected from the group consisting of phthalyl chloride and phthalic anhydride, said ester having the property of depressing the pour point of the oil.

3. A mineral lubricant oil composition of low pour point comprising a lubricant oil of high pour point and in admixture therewith a small proportion of a product produced by chemically condensing phenol and chlorinated wax in the presence of aluminum chloride as catalyst, and thereafter reacting the product thus obtained with phthalyl chloride without removal of the aluminum chloride catalyst and separating the aluminum chloride from the reaction product, said reaction product having the property of depressing the pour point of the oil.

4. A mineral oil composition comprising a mixture of liquid oils and waxy hydrocarbons, and in admixture therewith a small proportion of the reaction product produced by chemically reacting one equivalent amount of phenol with sufficient chlorinated wax, containing 14% of chlorine, to provide four equivalents of chlorine, heating the mixture to about 150° F., adding thereto anhydrous aluminum chloride to the extent of 3% of the chlorwax added, heating the mixture slowly to 350° F. to complete condensation of phenol and chlorwax, then cooling the mixture to about 300° F., adding one equivalent of phthalyl chloride, and after the addition of the phthalyl chloride cooling and water-washing the reaction product to remove aluminum chloride, the reaction product thus obtained having the ability to depress the pour point of the said mixture of liquid oils and waxy hydrocarbons.

5. The method of making a hydrocarbon lubricant oil of low pour point which comprises the following steps: Chemically reacting chlorwax and phenol by means of anhydrous aluminum chloride as catalyst, the reaction being initiated at a temperature of about 150° F., and slowly heating the reactants to about 350° F., the chlorwax containing around 14% of chlorine, the proportions of the ingredients being such that about four equivalents of chlorine are initially present for each equivalent of phenol and such that there is present an amount of aluminum chloride corresponding to about 3% of the chlorwax, cooling the reactants to a temperature of about 200° F., adding to the reaction mixture one equivalent of phthalyl chloride to esterify the phenol product thus obtained, washing the reaction product to remove substantially all aluminum chloride, and adding a relatively small amount of the finished reaction product thus obtained to a mineral hydrocarbon oil of initially high pour point.

6. The method of making a hydrocarbon lubricant oil of low pour point which comprises the following steps: Chemically reacting chlorwax and phenol in the presence of anhydrous aluminum chloride as catalyst, initiating the reaction at about 150° F., and slowly heating the reactants to about 350° F., the chlorwax containing around 14% of chlorine, the proportions of the ingredients being such that around four equivalents of chlorine are initially present for each equivalent of phenol and such that there is present in the reaction mixture an amount of aluminum chloride corresponding to about 3% by weight of the chlorwax, cooling the reaction mixture to a temperature of about 300° F., adding to the reaction mixture one equivalent of phthalyl chloride to esterify the phenol product thus obtained, washing the reaction product to remove substantially all aluminum chloride, and adding a relatively small amount of the finished reaction product thus obtained to a mineral hydrocarbon oil of initially high pour point.

7. The method of making a hydrocarbon lubricant oil of low pour point which comprises the following steps: Chemically reacting chlorwax and phenol in the presence of anhydrous aluminum chloride as catalyst, initiating the reaction at about 150° F., and slowly heating the reaction mixture to about 350° F., the chlorwax containing around 14% of chlorine, the proportions of the ingredients being such that about four equivalents of chlorine are initially present for each equivalent of phenol and such that there is present in the reaction mixture an amount of aluminum chloride corresponding to about 3% by weight of the chlorwax, cooling the mixture to a temperature of 200° F., adding to the reaction mixture one equivalent of phthalyl chloride to esterify the phenolic compound thus obtained, washing the reaction mixture with water containing a small amount of butanol, to remove aluminum chloride, and adding a small amount of the finished reaction product thus obtained to a mineral hydrocarbon oil of initially high pour point.

8. A mineral oil comprising a mixture of liquid oils and waxy hydrocarbons, and having incorporated therein a small proportion, not more than 1%, of the phthalic ester of a heavy alkyl substituted phenol, said ester being capable of depressing the pour point of the oil.

9. A mineral lubricant oil composition of low pour point comprising a lubricant oil of high pour point and in admixture therewith a small proportion, not more than 1%, of a product produced by chemically condensing phenol and chlorinated wax in the presence of aluminum chloride as catalyst, and thereafter reacting the product thus obtained with phthalyl chloride without removal of aluminum chloride, purifying the reaction product by separating the aluminum chloride therefrom, said reaction product having the property of depressing the pour point of the oil.

10. A mineral oil composition comprising a mixture of liquid oil and waxy hydrocarbons and in admixture therewith a small proportion of an added compound having a composition corresponding substantially to the general formula

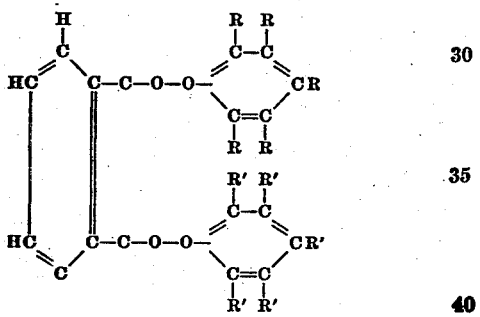

wherein at least four of the R's and four of the R"'s are heavy alkyl radicals corresponding to those which characterize petroleum wax, said compound having the power of depressing the pour point of the said mixture of mineral oil and waxy hydrocarbons.

11. A mineral oil composition comprising a mixture of liquid oil and waxy hydrocarbons and in admixture therewith a small proportion, not more than 1%, of an added compound having the general formula

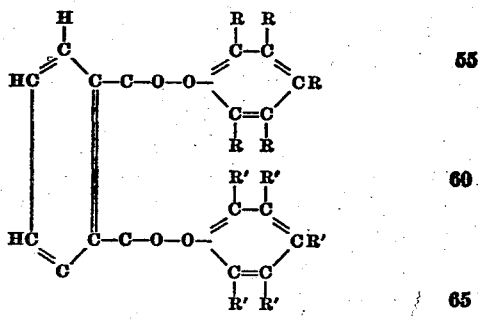

wherein at least four of the R's and four of the R"'s are heavy alkyl radicals corresponding to those which characterize petroleum wax, said added compound having the power of depressing the pour point of the said mixture of oil and waxy hydrocarbons.

ORLAND M. REIFF.
DARWIN E. BADERTSCHER.

July 21, 1936.　　　　　E. G. ROEHM　　　　　2,048,467
GRINDING MACHINE
Filed Nov. 5, 1934　　　　6 Sheets-Sheet 1

INVENTOR.
ERWIN G. ROEHM
BY
ATTORNEY.